Oct. 28, 1958     O. MITCHELL     2,858,174
BEARING MOUNTING
Filed Feb. 17, 1956
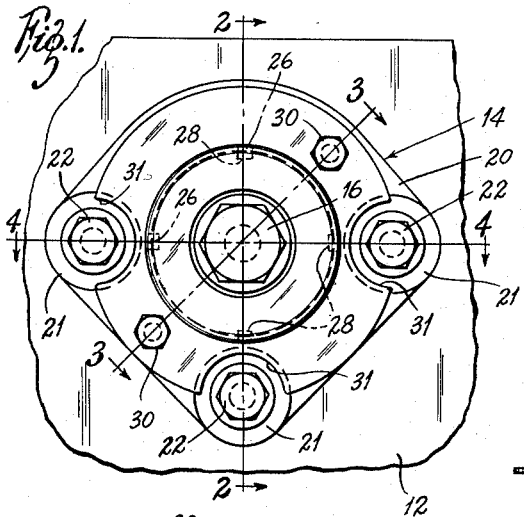
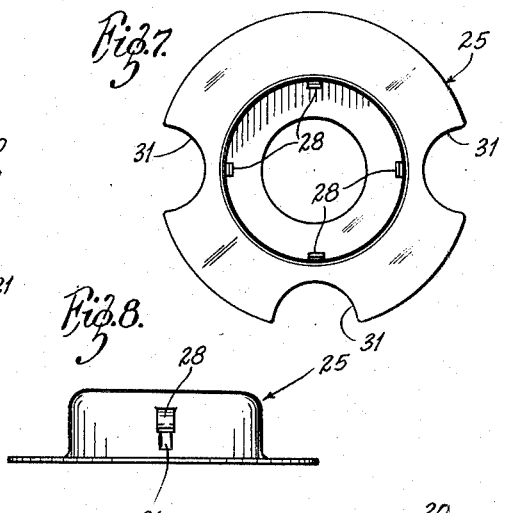
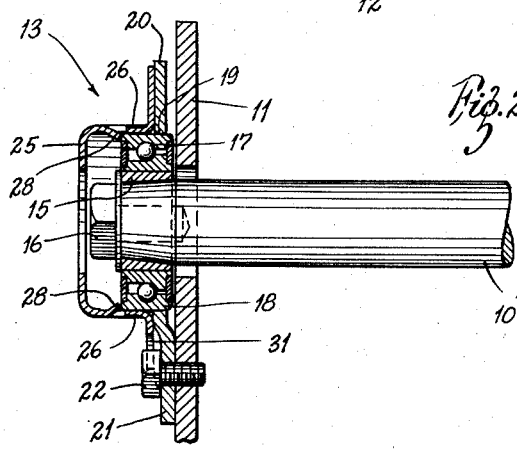
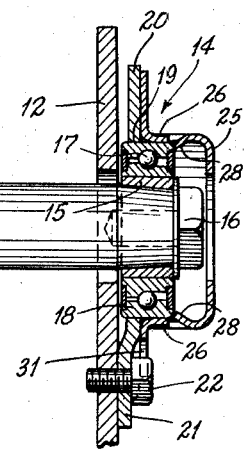
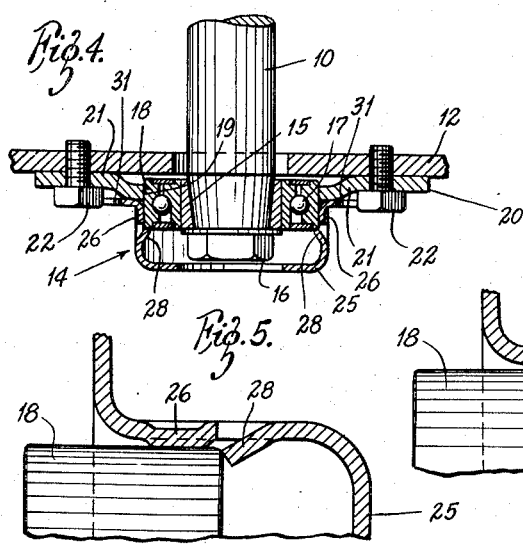
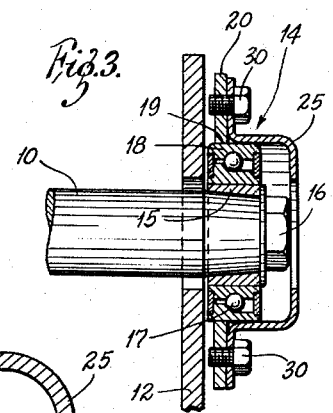
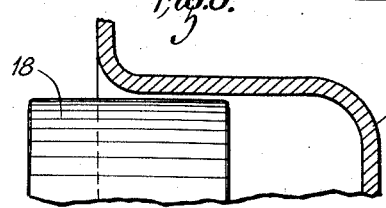
INVENTOR:
ORVILLE MITCHELL,
BY Kingsland, Rogers & Ezell
ATTORNEYS

United States Patent Office 2,858,174
Patented Oct. 28, 1958

2,858,174

BEARING MOUNTING

Orville Mitchell, Dallas, Tex., assignor to John E. Mitchell Company Inc., Dallas, Tex., a corporation of Missouri Application February 17, 1956, Serial No. 566,211

7 Claims. (Cl. 308—178)

This invention relates to a bearing mounting. It is particularly useful supporting opposite ends of the cylinders or other like parts of cotton cleaning equipment, although many other uses may be made of it.

Bearings formerly used for the purposes of the new bearing hereof, consisted of radial, taper-bored bearings housed in a cartridge with felt seals, the cartridge being mounted in a holder attached to the end frames or supports in such a way as to provide some slight self-alignment. However, since desirably the parts are made of stampings or extrusions or like mass production components, some variations occur in size of the opening of the holder and in metal thickness, resulting in poor fit between the cartridge and the holder. Some cartridges fit too tightly, so that they provide no self-alignment; others fit too loosely, permitting rattle, chatter and wear. And also the old type bearings had only an oil cup extrusion on the cartridge that engaged a notch in the holder to prevent the cartridge from rotating with the shaft.

The new bearing is designed to overcome all the foregoing disadvantages. It does so at lower cost, and yet provides a more accurate and dependable mounting.

In the new bearing, a conventional self-lubricating taper-bored, ball-bearing is used, with a cap and a holder of especial design. The outer race fits closely into the holder to give accurate location of the axis, but the holder is thin enough at the engagement to permit some rocking and hence self-alignment. The cap is designed to secure the outer bearing race tightly against rotation, but in a way to avoid distortion of the race and compression on the balls. Rotation of the cap is prevented by amply strong parts.

In the drawing:

Figure 1 is an end elevation of one of the bearings in place on a machine;

Figure 2 is a sectional view on line 2—2 of Figure 1, of a shaft having the bearings on both ends;

Figure 3 is an enlarged diametrical section through the bearing taken on the line 3—3 of Figure 1, at 45° to the section of Figure 2;

Figure 4 is a horizontal diametrical section of the bearing of Figure 1, taken on the line 4—4 thereof;

Figure 5 is an enlarged fragmentary section of a portion of the bearing showing the engagement between the cap and the outer bearing race;

Figure 6 is an enlarged fragmentary section of a portion of the bearing showing the loose fit of the cap and race away from the parts in Figure 5;

Figure 7 is an inside view of the bearing cap; and

Figure 8 is a top edge view of the bearing cap.

In Figure 2, a shaft 10 is adapted to be supported on two end frames or supports 11 and 12, by bearings generally designated 13 and 14. This shaft may support such equipment as the cylinders of a cotton-cleaning machine or the like. Such application of the invention is mentioned because it illustrates the type of loads encountered, and also comprises a shaft requiring a certain amount of mutual alignment of its two end bearings, as well as absence of any substantial degree of end play. The bearings may be duplicates, however, and only one is described, namely, the right one in Figure 2, though reference numbers are also applied to the one at the left.

The bearing has a taper-bored inner-race support 15 mounted on the end of the shaft 10 and secured by a cap screw 16. The ball bearing 17 is thus mounted on the end of the shaft. The outer race 18 of the bearing 17 fits through a hole 19 in a holder 20, the fit being snug with about .001" clearance. At the point of engagement between the race and the holder, the holder has a thickness of not over about ⅛", so that a perceptible degree of self-alignment of the shaft and bearing is permitted.

The holder 20, usually a metal stamping, is given three projections 21 that are offset from the main plane of the holder, so as to provide some space between the main part of the holder and the end frame 12. The outer race is thus supported on the holder nearer the vertical plane of the balls. Three self-threading screws or cap screws 22 pass through holes in the projections 21 to secure the holder to the frame 12.

A cap 25 of considerably lighter gauge metal, fits over the outer bearing race. This cap contains some important features of the invention.

The cap 25 has a loose fit all around the bearing race 18, as shown in Figure 6, except at four points, where dimples 26 are indented inwardly in the walls of the cap, as shown in Figure 5. The dimples tightly engage the outer race with sufficient force to prevent the race from turning in the cap 25. In a bearing of about one inch internal diameter, the dimples may be offset inwardly about .010". This will provide a net initial internal diameter about .008" less than the outer diameter of the bearing race 18.

Also, the cap 25 is provided with four, inwardly-struck pips or lugs 28, that limit the endwise movement of the race 17 into the cap. The cap is attached to the holder by screws 30 as illustrated in Figure 3. They may be self-threading screws. Notches 31 in the cap enable it to pass around the screws 22, and to be taken off without removing those screws.

In assembling the bearings on to a shaft, the holders 20 are first fastened to the machine by the screws 22, one on the right end frame 12 and one on the left end frame 11. Next the bearings 17 are slipped onto the ends of the shaft 10, one on each end, the taper bore of the inner-race supports seating on the corresponding tapers of the shaft 10, and the outer races fitting snugly into the holders 20. This locates the bearings radially, and provides proper alignment of the bearings in the manner suggested earlier.

Then the caps 25 are placed on the ends of the assembly being pushed home to force the dimples 26 over the outer races 18 and the pips 28 to engage the ends of the races. The caps are then secured by the self-threading screws 30, or the like. Applying the caps 25 causes the pips 28 to locate the shaft endwise and thereafter to prevent endwise movement of the shaft. The dimples 26 hold the race against turning, but do not bind the race tightly enough to distort it or bind the balls. The dimples may easily be made deep enough to insure adequate hold on the race despite reasonable manufacturing tolerances, and their small size and limited area of contact avoids their causing distortion.

What is claimed is:

1. In a bearing arrangement: a shaft adapted to be supported at its opposite ends; ball bearings at the opposite ends of the shaft, each having an outer race; a holder around each outer race having a close fit therewith, to afford proper radial position of the shaft end bearings, but without endwise positioning; a cap for each end, the cap having an internal diameter freely larger than the outer race so as to be out of contact therewith, but provided with spaced, inward projections around the inner surface thereof that bind with the outer race at spaced points around the same, abutments in the cap engageable with the bearing to limit endwise movement of the shaft outwardly toward the cap, and means securing the caps to the holders, so that the two caps align the shaft axially and hold it against endwise movement.

2. In a bearing arrangement: a ball bearing adapted to be secured to the end of a shaft; a holder having an opening to receive the outer race of the bearing snugly, permitting movement of the bearing and shaft axially while confining it radially; and a cap releasably attached to the holder, the cap engaging the bearing race to prevent it from rotating and having parts engaging it to hold it against movement axially, the last-named parts being inturned parts in the side wall of the cap engageable with the end of the bearing race, the side wall of the cap being of relatively thin sheet metal, and the inturned parts being integral portions of the same sheet metal displaced from the rest thereof.

3. In a bearing arrangement: a ball bearing adapted to be secured to the end of a shaft; a holder having an opening to receive the outer race of the bearing snugly, permitting movement of the bearing and shaft axially while confining it radially; and a cap releasably attached to the holder, the cap engaging the bearing race to prevent it from rotating and having parts engaging it to hold it against movement axially, the cap having dimples indented inwardly from its side walls, to engage tightly onto the outside of the bearing race so as to hold the bearing race against rotation in the cap.

4. In a bearing arrangement: a ball bearing adapted to be secured to the end of a shaft; a holder having an opening to receive the outer race of the bearing snugly, permitting movement of the bearing and shaft axially while confining it radially; and a cap releasably attached to the holder, the cap engaging the bearing race to prevent it from rotating and having parts engaging it to hold it against movement axially, the holder being thin where the bearing race passes through it, so that the race may have some self-aligning movement therein while held snugly against radial displacement.

5. In a bearing arrangement: a ball bearing adapted to be secured to the end of a shaft; a holder having an opening to receive the outer race of the bearing snugly, permitting movement of the bearing and shaft axially while confining it radially; and a cap releasably attached to the holder, the cap engaging the bearing race to prevent it from rotating and having parts engaging it to hold it against movement axially, the holder comprising a plate having a plurality of projections offset from the plate, and the projections being adapted to be attached to a support, and to hold the plate away from the support.

6. The combination of claim 5, wherein the cap has a flange overlying the holder, and notched adjacent the projections on the holder so as to give access to fastening means in the projections.

7. In a bearing arrangement: a ball bearing adapted to be secured to the end of a shaft; a holder having an opening to receive the outer race of the bearing snugly, permitting movement of the bearing and shaft axially while confining it radially; and a cap releasably attached to the holder, the cap engaging the bearing race to prevent it from rotating and having parts engaging it to hold it against movement axially, the cap being of sheet metal, with the parts engaging the end of the bearing race comprised of small parts of the cap sheared on three sides and bent inwardly to provide lugs, and wherein the metal of the cap is indented inwardly in a plurality of spaced dimples that afford a net inside diameter initially less than that of the race so that when forced into the race, the cap is tightly held thereon in a few spaced points around the periphery thereof.

References Cited in the file of this patent

UNITED STATES PATENTS 2,373,859     Teaf _____ Apr. 17, 1945

FOREIGN PATENTS 572,482     Great Britain _____ Oct. 10, 1945